United States Patent [19]

Thompson

[11] 4,395,819
[45] Aug. 2, 1983

[54] APPARATUS FOR LOADING PRE-CLOSED SLIDE MOUNTS

[75] Inventor: Edwin R. Thompson, Stamford, Conn.

[73] Assignee: Forox Corporation, Stamford, Conn.

[21] Appl. No.: 376,636

[22] Filed: May 10, 1982

Related U.S. Application Data

[62] Division of Ser. No. 172,066, Jul. 24, 1980, Pat. No. 4,342,147.

[51] Int. Cl.³ .............................................. B23P 19/04
[52] U.S. Cl. .................................... 29/806; 29/33K; 53/520
[58] Field of Search ............... 29/33 K, 417, 412, 806, 29/809; 40/152; 53/435, 520, 252, 381 R, 564

[56] References Cited

U.S. PATENT DOCUMENTS 3,470,642 10/1969 Mundt et al. .......................... 40/152
3,952,434 4/1976 Florjancic ............................. 40/152
4,102,029 7/1978 Thompson ............................ 29/417

Primary Examiner—Ervin M. Combs
Attorney, Agent, or Firm—Parmelee, Bollinger and Bramblett

[57] ABSTRACT

A pre-closed slide mount has two sides secured together defining an internal pocket to retain a film transparency T inserted edgewise through an entranceway in one edge of the slide mount, which has a window for viewing. A retraction clearance slot at one end of the entranceway may provide clearance for the bowed filmstrip pusher S to be retracted while lateral movement 38 of the slide mount commences. The transparency T is cut from the leading end of the filmstrip S while said end is entirely outside of the entranceway into the slide mount. A reciprocatable pawl and its associated reciprocating drive means produces a forward stroke F of the filmstrip S equal to the length of the transparency T plus an additional extent of forward travel sufficient for pushing the transparency T completely into said pocket. Then, the filmstrip is retracted R by a distance sufficient for completely removing the film strip from the loaded slide mount. Thus, slide mounts pre-closed along all three edges are loaded in a fast cycle.

11 Claims, 12 Drawing Figures

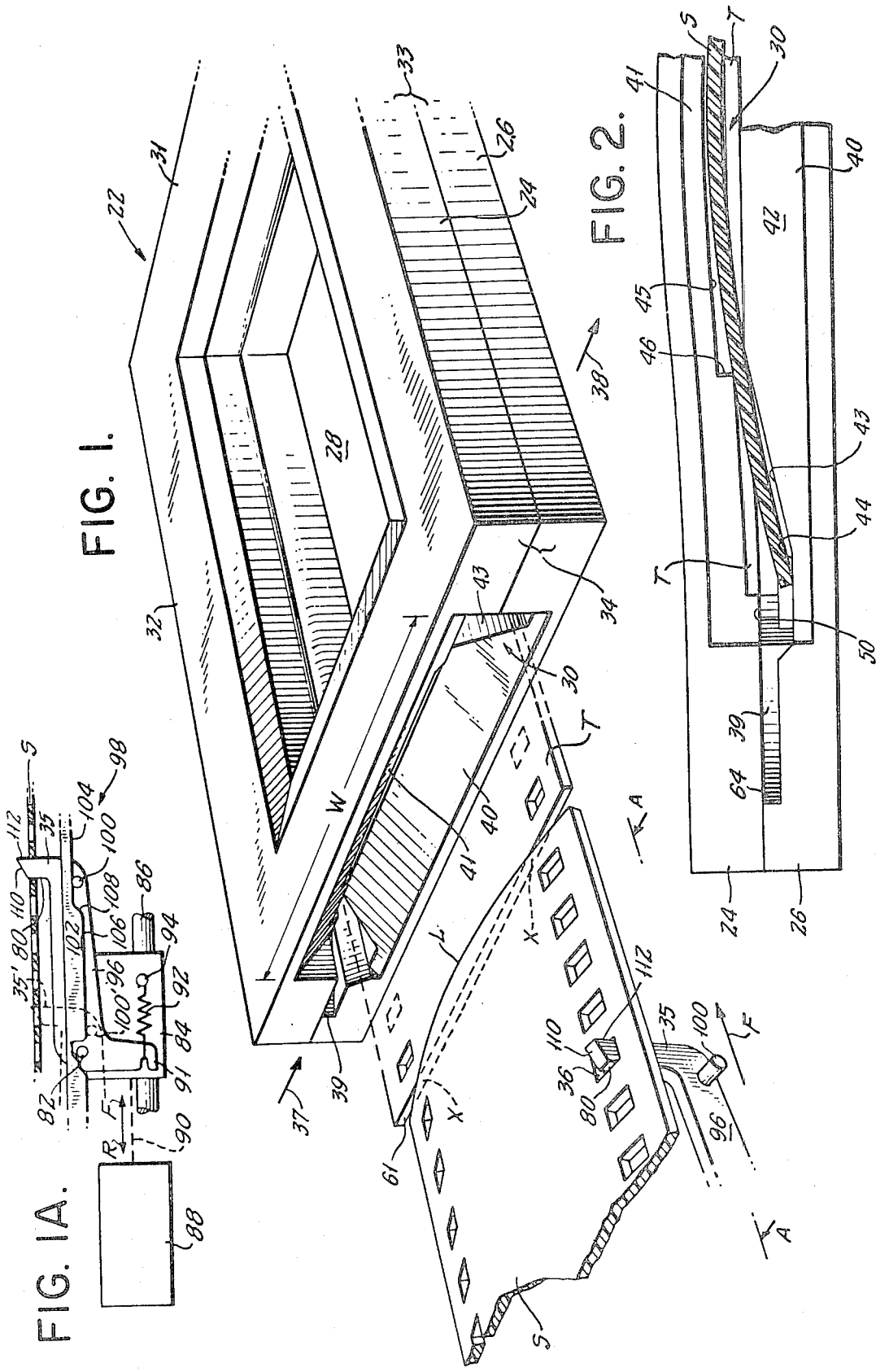

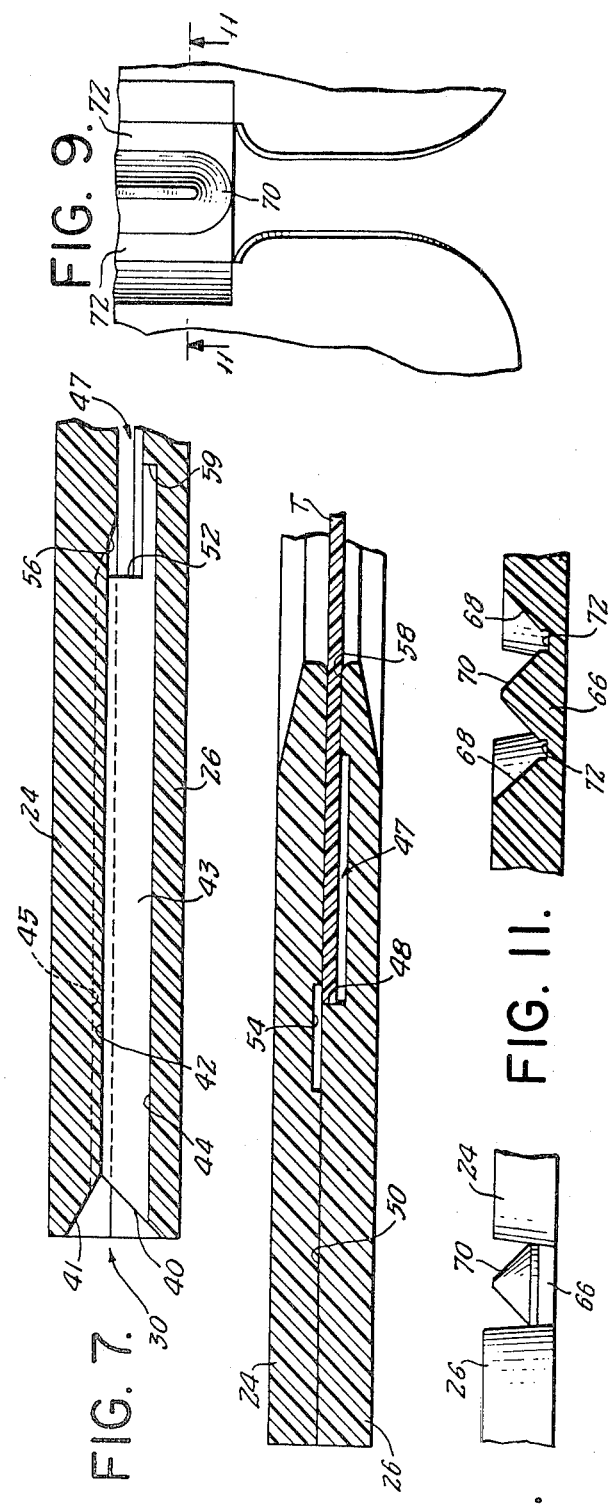

APPARATUS FOR LOADING PRE-CLOSED SLIDE MOUNTS

This is a division of application Ser. No. 172,066, filed July 24, 1980, now U.S. Pat. No. 4,342,147.

BACKGROUND OF THE INVENTION

This invention relates to slide mounts and more particularly to such mounts which facilitate automatic loading of film transparencies into pre-closed slide mounts.

Film transparencies have long been clamped between masks to form photographic slides. In recent years, those transparencies have been automatically loaded through one edge of a slide mount formed of two joined masks. For example, in the U.S. Pat. No. 3,952,434 to Peter Florjancic, a transparency is pushed by a flat pusher element between spreadable transverse bridges of the two masks. These transverse bridges in the Florjancic mount normally have their inner faces in contact one with the other across the full width of the entranceway. Therefore, to provide sufficient room for inserting the film transparency these bridges must be bowed relatively widely apart, which is not a desirable operation; and this wide bowing of the bridge is accomplished by the exertion of a relatively large force, which is not desirable when pushing a relatively delicate film transparency into the pocket between the plastic masks. In other words, the Florjancic mount offers considerable resistance or impediment to the insertion of a film transparency, and the resultant significant forces involved can lead to operating problems or to damage of film transparency or mount. Because the pocket is spaced inwardly from the outer edge of the slide mount, it is necessary that the pusher follow the transparency through the entranceway, so that the film transparency becomes fully pushed into the pocket.

In U.S. Pat. No. 3,470,642 to Peter Mundt and Peter Florjancic is disclosed a slide mount having an insertion slot which extends fully across one end of the mount and also extends part of the way along the two side edges of the mount. Thus, the two border portions of the mount which define the insertion slot between them are entirely self-supporting for they each project parallel one to another in cantilevered relationship from the main body of the mount. These projecting, self-supporting border portions of the slide mount are likely to become snagged on neighboring objects. Also, the slot itself is unattractively large, extending completely across one end and partially along the two side edges; thus, the Mundt and Florjancic slot occupies all or part of three edges of the mount.

In my U.S. Pat. No. 4,102,029, which issued on July 25, 1978, there is disclosed an improved method and apparatus for loading transparencies into a preclosed slide mount. As set forth in that patent, a film transparency is cut from a film strip, and the cut transparency is pushed into the pre-closed slide mount by means of the film strip itself which is intentionally bent into a longitudinally bowed configuration in order to provide longitudinal strength, in the manner of a longitudinally bowed carpenter's measuring tape, while the entrance edge of the slide mount is spread by wedges during the insertion.

As explained in U.S. Pat. No. 4,102,029, there are a number of advantages of utilizing the bowed film strip as the pusher element. The film may be cut to form each individual transparency before, not after, the transparency is inserted into the slide mount. The moving parts are very light with low inertial forces, because the individual cut transparency has only a small amount of mass to be accelerated. By virtue of the fact that the end of the film strip is used as a pusher, the pusher cannot wear out, for a new cut end is exposed in each recurring cycle of operation. Thus, high rates of speed and efficient, fast slide-loading production can be obtained with low power consumption in a compact, reliable slide-loading machine.

SUMMARY

An object of the present invention is to provide a pre-closed slide mount suitable for automatic loading of transparencies using a bowed film strip as the pusher element and which obviates the need for spreading the edge portions of the pre-closed slide mount by a wedge member or the like.

A further object of this invention is to provide a pre-closed slide mount which offers little resistance to a transparency being inserted into the mount, yet which subsequently securely retains the transparency within the pocket in the mount.

Further objects of this invention are to provide a pre-closed slide mount which may be molded as a single integral member of plastic material, such slide mount having sufficient rigidity for holding a transparency flat yet having a configuration at the entranceway to keep the resistance to loading of a film transparency to a minimum.

Among the advantages of the pre-closed slide mount embodying the present invention are those resulting from the fact that the mount is effectively pre-closed along all three edges, and yet the film transparency can be readily inserted without encountering much resistance so that relatively low pushing forces are involved and nevertheless the fully inserted transparency is securely retained in the pocket within the mount. In other words, the border portions of the pre-closed mount which define the entranceway need not be cantilevered from the main body of the mount as occurs in the mount described in U.S. Pat. No. 3,470,642.

Advantageously, the method and apparatus for loading the film transparency into the improved slide mount serve to retract the bowed film strip slightly during the end of each loading cycle for withdrawing the end of the bowed film strip out of the entranceway of the pre-closed slide mount after the film transparency has been fully pushed into the pocket therein.

In accordance with the invention in one of its aspects, a pre-closed slide mount for holding a film transparency comprises a pair of sides or masks united face-to-face for defining an internal pocket to retain a film transparency which is inserted edgewide through an opening or entranceway in one edge of the mount. The pre-closed mount defines a window for viewing the transparency after it has been loaded into the pocket in the mount. An elevated border region formed in one mask of the pre-closed slide mount extends transversely across the entranceway and has a sloping outer surface to provide a funnel for directing a transparency into the entranceway. This elevated border region is of a length less than the width of the transparency and less than the corresponding width of the pocket. At each end of this elevated border region there is a valley for receiving an outer edge of a longitudinally bowed transparency pusher, and these two spaced valleys permit the pusher to remain bowed until the transparency is firmly seated within the pocket in the pre-closed mount.

According to the invention in other of its aspects, the ends of the elevated border region slope laterally away from the adjacent border of the other mask to define the respective valleys, and the adjacent border forms an elevated roof over the elevated border region, that roof having inverted steps at the ends thereof over the laterally sloping end portions of the elevated border region. The film transparency and the bowed end of the pusher film strip are readily inserted into this advantageously configured entranceway. A deflecting surface inward of the elevated roof and over the pocket deflects a transparency into the pocket and an abrupt inner face of the elevated border region defines a shoulder at the entrance edge of the pocket to retain the transparency within the pocket.

According to other aspects of the invention, the elevated border region is elevated above the remaining border regions surrounding the transparency pocket and the relatively thin elevated roof has a sloping edge to provide a very flexible funnel element for accommodating the insertion of a transparency.

According to another aspect of the invention, a retraction clearance slot may be provided adjacent one of the valleys to provide clearance in order that a fully loaded mount may begin moving laterally away from the loading station even though the pusher strip has not yet been fully retracted out of the entranceway.

According to yet another aspect of the invention, the edges of the valleys away from the elevated border region form lateral guides for centering a transparency within the pocket. Thus, the transparency becomes relatively accurately registered laterally within the slide mount, and it is prevented from any significant tilting in its own plane in the mount.

According to other aspects of the invention, clamping ribs are positioned within the pocket adjacent the window for snugly holding the transparency within the pocket. Isolation grooves are provided along the edge of the pocket to prevent plastic flash from entering the pocket during an ultrasonic welding process.

According to a further aspect of the invention, the slide mount is formed of two mask sides joined by a plastic hinge having spaced alignment ridges thereon for accurately aligning the two sides of the mount prior to their being secured together.

The loading method of the present invention may be embodied in such a way that the pawl which drives the bowed film strip for pushing a film transparency into a pre-closed slide mount also serves to retract the bowed film strip a short distance during the end of each loading cycle for withdrawing the end of the bowed film strip out of the entranceway of the pre-closed slide mount after the film transparency has been fully pushed into the pocket in the mount. Thus, the loaded mount can be moved laterally way from the loading station.

The term "pre-sealed" or "pre-closed", as used herein, means that each slide mount has two sides or masks which are permanently fastened or secured together in closed position by the slide manufacturer defining a receiving pocket between them. This fastening can be achieved by adhesive bonding, thermal bonding, ultrasonic bonding or any other suitable technique for securing multiple plies or layers of cardboard or of plastic together.

BRIEF DESCRIPTION OF THE DRAWINGS

The foregoing and other aspects, objects, features, and advantages of the invention will become more fully understood from the following description of a preferred embodiment of the invention, as illustrated in the accompanying drawings, in which like reference characters refer to the same parts throughout the different views. The drawings are not necessarily to scale, emphasis instead being placed upon illustrating the principles of the invention.

FIG. 1 is an enlarged perspective view illustrating an improved slide mount embodying the invention with a transparency being pushed edgewise into the slide mount by a longitudinally bowed film strip serving as a pusher;

FIG. 1A is a partial elevation and sectional view as taken generally along line A—A in FIG. 1, illustrating the advantageous loading method in which the pawl also serves to retract the bowed film strip a short distance;

FIG. 2 is an enlarged end view of the left side of the slide mount of FIG. 1 with the entranceway roof flexed upwardly slightly by the inserted transparency. The remaining Figures are all also drawn on enlarged scale;

FIG. 5 is a partial end view of the slide mount similar to FIG. 2 but before insertion of a transparency;

FIG. 6 is a longitudinal cross-sectional view of the pre-closed slide mount taken along line 6—6 of FIG. 4 and with a transparency mounted therein;

FIG. 7 is a partial longitudinal cross-sectional view of a closed slide mount taken along line 7—7 of FIG. 4;

FIG. 8 is a partial transverse cross-sectional view of the left side of the closed slide mount taken along line 8—8 of FIG. 4;

FIG. 9 is an enlarged plan view of a portion of the hinge taken from the lower center portion of FIG. 4;

FIG. 10 is a side view of the hinge of FIG. 9; and

FIG. 11 is a sectional view of the hinge of FIG. 9 taken along line 11—11.

DESCRIPTION OF A PREFERRED EMBODIMENT

Figure 3:
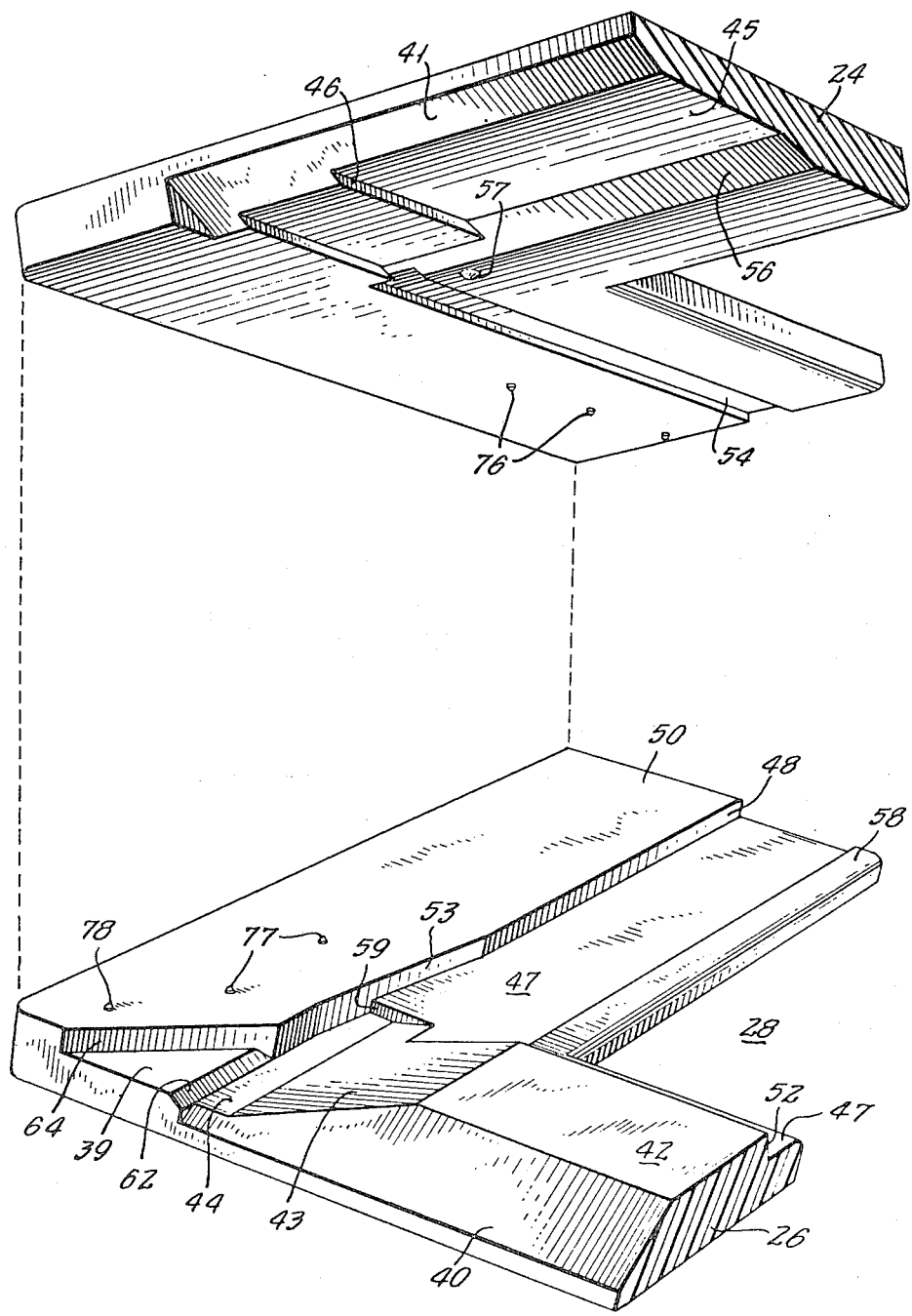
FIG. 3 is a partial perspective view of the lower and upper sides or masks of the slide mount of FIG. 1 with those mounts pulled apart.

As shown in FIG. 1, a pre-closed slide mount 22 in a loading station is formed from two sides or masks 24 and 26 joined face-to-face to define a window 28 and a funnel entrance 30 leading into an internal pocket as will be described in detail further below. A film transparency T is pushed into the funnel entrance 30 by means of a longitudinally bowed transparency strip S which serves as the pusher element.

The apparatus for advancing the pre-closed slide mounts one at a time into the loading station and for bowing the film strip S longitudinally and for cutting off the transparency T from the end of the film strip may be similar to that as described in my above-mentioned patent. However, no wedges are employed for opening the entrance into the pre-closed mount 22. It is to be noted that the mount 22 is effectively pre-closed along all three of its edges, i.e. along its hinge end 31 and along its two side edges 32 and 33. The entrance 30 does not extend all of the way across the front edge 34, and yet the film transparency can readily be slid into the pre-closed mount while encountering only relatively small resistance.

In FIG. 1, the relative thicknesses of the pre-closed slide mount 22 and the transparency T and film strip S are all exaggerated for purposes of clarity of illustration, and similar exaggerations of relative thicknesses are made in other views for clarity of illustration.

A film-engaging claw or pawl 35 enters into one of the sprocket holes 36 in the film strip S and remains engaged in this hole 36 during the full forward stroke F of this pawl which causes the bowed film strip S to push the previously cut-off transparency T into the pre-closed slide mount 22. As will be understood from a study of FIG. 6, the pocket which retains the transparency T is located within the slide at a distance from the entrance 30. Thus, the bowed leading (pushing) end L of the bowed film strip S proceeds into the entrance 30 for a sufficient distance to push the transparency T all of the way into the pocket within the pre-closed slide mount 22. Immediately after the transparency T is fully inserted, the bowed film strip S is retracted a short distance such that its leading end L is clear of the entrance 30.

As explained in U.S. Pat. No. 4,102,029, a preclosed slide mount may be moved laterally into the loading station, for example, in the direction 37 in FIG. 1. A loaded mount is then laterally moved out of the loading station in the direction 38, it being understood that the directions 37 and 38 could both be reversed. The leading end L of the bowed film strip is retracted clear of the entrance 30, so that the loaded mount can immediately be moved away laterally from loading station as indicated by the arrow 38.

In order to speed up the loading cycle even further, if desired, the loaded slide mount may begin moving laterally in the direction 37 even before the leading end L of the bowed film strip is fully withdrawn from the entrance 30. A diagonal clearance slot 39 at one side of the entrance 30 provides clearance for allowing the lateral movement 38 of the mount to occur while the bowed pusher film strip S is being retracted out from the entrance 30. The manner in which the pawl 35 advantageously serves to retract the bowed film strip S a short distance during its retraction stroke R (FIG. 1A) will be explained in detail further below.

The funnel entrance 30 is formed by an upwardly sloping surface 40 on the lower mask 26 and a downwardly sloping surface 41 on the upper mask 24, it being understood that such orienting terms as "upper" and "lower" are relative, being used for convenience of explanation. The pre-closed slide mount 22 may, in fact, be loaded upside down or standing on end or oriented diagonally with respect to the earth's horizon. In other words, the mount 22 can be loaded in other orientations, other than with the mask 24 positioned horizontally on top.

As shown in FIG. 2, the upwardly sloping surface 40 is formed on an elevated border region 42 of the lower mask 26. This elevated region 42 extends transversely and also has laterally sloping ends 43, one of which is shown in FIG. 2. Each sloping end 43 defines a valley, the floor of which is indicated at 44.

The border portion of the upper mask 24 over the elevated border region 42 forms an elevated roof 45 positioned over the elevated region 42, and that roof 45 has an inverted step 46 at each end thereof. The steps 46 are positioned over the laterally sloping surfaces 43.

Figure 4:
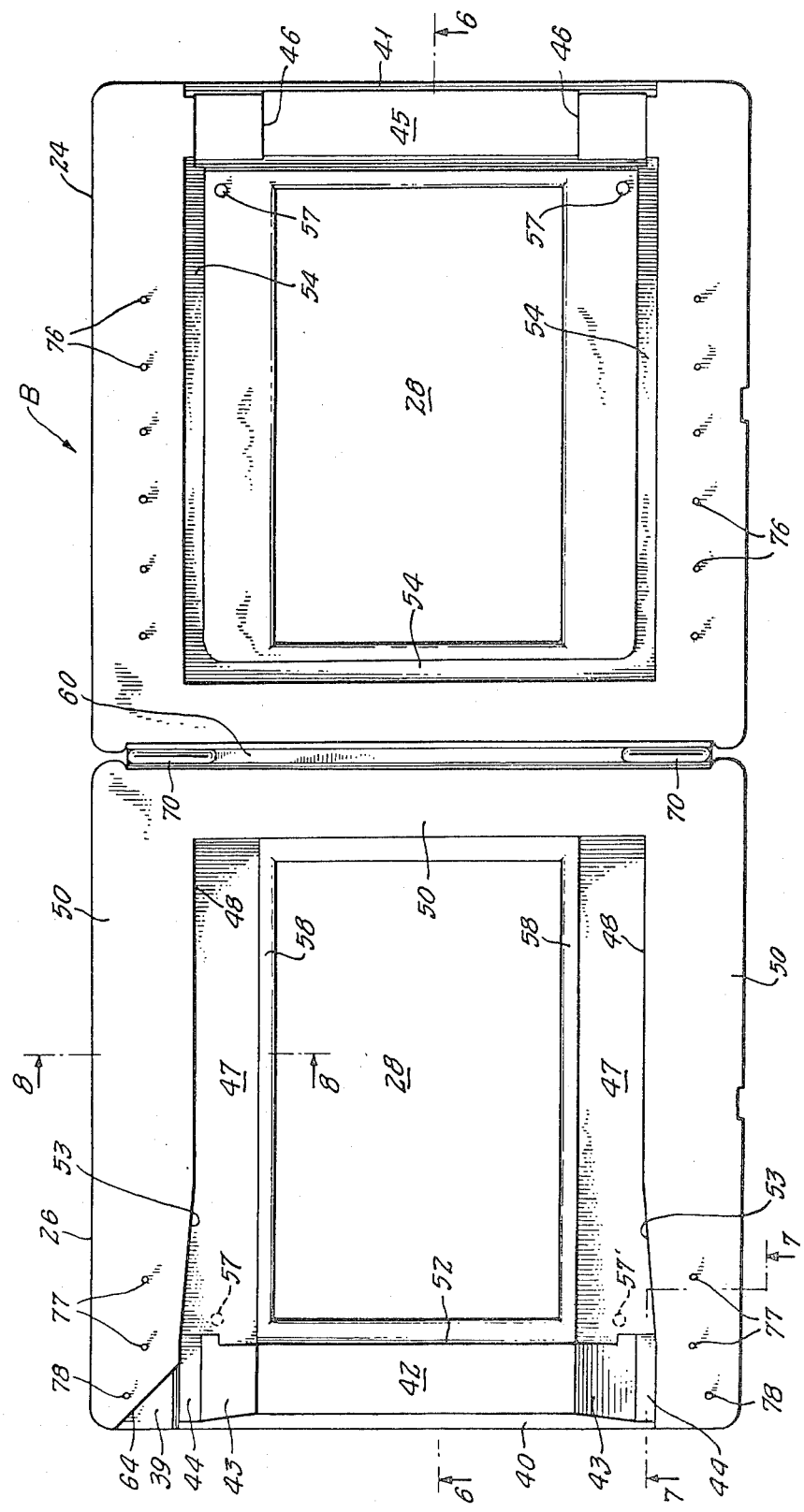
FIG. 4 is a plan view of the improved slide mount in its open position prior to securing of the two sides together to form the pre-closed mount.

As best shown in FIGS. 3 and 4, a pocket recess 47 surrounding the window 28 is defined and surrounded on three sides by the inner vertical face 48 of a border region 50. Along the entrance border portion of the lower mask 26, the pocket is defined by the inner vertical face 52 of the elevated border region 42. Thus, the elevated border region 42 not only serves to provide a sloping funnel entrance surface 40 for the transparency and valleys 44 for the bowed pusher, but also provides an inwardly-facing transparency-retaining shoulder 52. With the exception of the elevated roof 45, downwardly sloping funnel surface 41 and deflecting surface 56, and inverted steps 46 along the entrance border portion of the upper mask 24 and an isolation groove 54 to be discussed subsequently, the inside (lower) face of the mask 24 is substantially flat. Thus, the transparency, once loaded in the slide mount, is seated within a pocket 47 in the lower mask 26 below the upper mask 24 which defines the top surface of the pocket.

As shown in FIG. 6, the deflecting surface 56 for deflecting a transparency downwardly into the pocket 47 is provided in the upper mask 24 behind the elevated roof 45 and inward of the transparency-retaining shoulder 52 of the elevated border region 42.

As shown in FIGS. 3 and 4, the inner face 48 of each of the side borders 50 is flared outwardly slightly adjacent to the rear end of the valley floor 40 to form converging lateral guides 53. With these lateral guides 53 converging inwardly, any off-centered transparency is laterally aligned by these guides as the transparency T is pushed into the pocket 47. Once seated in the pocket 47, the film is clamped snugly by a clamping rib 58 positioned within the pocket 47 to each side of the window 28. By means of these clamping ribs, sufficient frictional engagement is made with the transparency to prevent the transparency from shifting within the pocket 47; but resistance to the transparency moving into the pocket is substantially less than it would be if the entire pocket had the reduced clearance provided at the clamping ribs 58. Advantageously, these clamping ribs 58 are loacted immediately adjacent to the perimeter of the window 28 for holding the transparency T smooth and flat in this window.

As shown in FIG. 8, by virtue of the converging lateral guides 53, there can be very little clearance between the longitudinal edges of the transparency T and the inner faces 48 of the side borders 50. Thus, the transparency is relatively accurately registered laterally within the slide mount, which produces accurate vertical registration in the projector. The longitudinal edges of the transparency are its manufactured edges as distinguished from the end 61 (FIG. 1) which is cut just prior to loading, and therefore these longitudinal edges are truly parallel and very accurately spaced apart.

In addition, the closely adjacent relationship between the faces 48 or side walls of the pocket and the longitudinal edges of the transparency prevent the transparency from "cocking", i.e. from tilting in its own plane in the mount. Therefore, a projected picture is horizontal and does not have an annoying tilt. In summary, the present slide mount and loading method and apparatus do not rely upon sprocket holes to provide registration in the mount. Advantageously, much of the loose lateral fitting and picture cocking tendencies of transparencies in prior art slide mounts are avoided.

Additionally, frictional gripping humps 57 (FIGS. 3 and 4) are provided on the upper mask 24 in the pocket 47. These humps 57 are aligned with localized regions 57' (FIG. 4) which are located closely behind the deflecting surface 56. The humps 57 press the corners of the seated transparency against the pocket floor immediately behind the retaining shoulder 52 and prevent the transparency from sliding back up over the shoulder 52 of the elevated border region 42.

Funneling of the transparency into the entrance 30 can best be understood with reference to FIG. 2. As shown in FIG. 2, the opposed border portions of the mask 24 and 26 forming the funnel entrance 30 are resiliently spreadable as the transparency T is easily slid beneath the step 46, for the elevated roof 45 is readily slightly bowed upwardly away from the elevated border region 42. As shown in FIG. 5, each of the inverted steps 46 is normally spaced slightly up away from the respective laterally sloping surface 43 of the elevated border region 42, leaving a gap 60. Consequently, the entrance 30 is already partially open. The entrance 30 of the pre-closed mount spreads fully open with only slight flexing of the elevated roof 45, and an entranceway for receiving the transparency into the pocket 47 (FIG. 3) is provided. With the roof 45 slightly flexed as shown exaggerated in FIG. 2, the transparency rides over the elevated border region 42 and is then deflected downwardly by the surface 56 into the pocket 47.

The bowed film strip pusher S follows the transparency T into the entranceway, and the corners of the leading end L of the bowed pusher are received unimpeded in the valleys 44. As seen in FIGS. 2 and 3, the valley floors 44 are lower than the pocket 47, and the ends 59 of the valleys (FIG. 3) are somewhat behind the retaining shoulder 52 of the elevated border region 42. Thus, the pusher film can make a full stroke to seat the transparency T in the pocket 47 without jamming against the valley-end surfaces 59.

By virtue of the configuration of the entrance 30, as seen in FIGS. 2 and 5, the leading end L (FIG. 1) of the film strip advantageously can remain in its bowed shape, even after it has entered into the entrance, thereby assuring a positive pushing relationship of the bowed end L against the back edge 61 (FIG. 1) of the generally flat transparency T. As seen in FIG. 1, the bowed end L intersects with the generally straight back edge 61 at two symmetrically located regions X for providing a stable forward push against the transparency.

Once the transparency has cleared the elevated border region 42, and the pusher strip S have been retracted, the roof 45 returns to its relaxed position and the transparency T is clamped within the pocket 47 by the overhead humps 57 which hold the back edge 61 of the transparency down behind the retaining shoulder 52.

As can be seen in FIGS. 2, 3, 5 and 6, the elevated border region 42 is elevated above the level of the border region 50 which extends along near three edges of the mount. This border region 50 is U-shaped, as seen in plan view in FIG. 4, and forms the interface between the upper and lower masks 24 and 26. The elevated roof portion 45, including the inverted step 46, is spaced above the elevated border region 42 even when the masks are not spread apart by a transparency. This structural configuration has several advantages. It results in a relatively thick transverse border member in the lower mask 26 at the entranceway to provide the rigidity desirable to hold a slide flat. In effect, the elevated border portion 42 forms a relatively rigid strut or leg extending across between and joining together the ends of the two legs of the U-shaped border region 50 which encircles the other three sides of the window 28. The corresponding border portion 45 or leg of the upper mask 24 is relatively thin and can thus readily flex when a transparency T is inserted into the slide mount, thereby reducing resistance to movement of the transparency and reducing the possibility of damaging the transparency or bowed pusher strip. The elevated border region 42 also increases the height of the transparency-retaining shoulder 52 so that the fully inserted transparency will not slip back out of the slide mount once seated in the pocket 47.

As noted above, the elevated roof 45 flexes upwardly when the transparency readily slides into the gap 60 between the inverted step 46 and the sloping end surface 43 of the elevated border region 42. The central portion of the elevated roof thus bows upwardly, as shown in FIG. 2, and is spaced above the central area of the slightly convex upwardly bowed transparency. Thus, the viewing portion of the transparency will not rub forcefully against the roof, thus scuffing of the picture area is avoided.

Sliding of the transparency between the corner of the inverted step 46 and the lateral slope 39 of the elevated border region 42 also causes the transparency T to bow somewhat convex upwardly. Thus, the under surface of the viewing portion of the transparency is also spaced from the flat top of the elevated border region 42 to prevent scratching of the underside of the transparency.

As mentioned above, once the transparency has been pushed beyond the retainer shoulder 52, the bowed pusher strip is retracted. In order to increase the speed of the loading operation, if desired, the loaded slide mount may be moved laterally, as mentioned above, in the direction 37 away from the loading position even before the pusher element has been completely retracted. To avoid binding of the pusher element with this lateral movement 38 of the loaded slide mount, the retraction clearance slot 39 is provided. Thus, with the slide mount moving to the right, as viewed in FIG. 5, the corner of the leading end L of the bowed pusher strip 5 rises up along the chamfered edge 62 of the slot floor and the pusher is fully retracted before abutting the angled clearance slot wall 64.

As shown in FIG. 4, the two masks 24 and 26 form two dissimilar sides of a single integrally molded plastic blank B formed of stiffly flexible and tough, durable plastic material, for example, such as high impact strength polystyrene. These masks are hinged together by a thin region of interconnecting plastic material 66 which forms the floor of a channel having sloping sides 68 (FIG. 11). A hinge alignment ridge 70 is formed at each end of the channel 66, 68; in other words, at each end of the hinge region. Each hinge alignment ridge 70 is formed with surfaces angled at 45° as are the sides 68 of the channel. Rectangular cross-section grooves 72 are formed along both sides of the base of the ridge 70 to reduce the amount of plastic at the flexure regions. The side 24 is folded over flush against the side 26, as best shown in FIG. 6, with the channel walls 68 abutting against the sloping surfaces of the respective ridge 70. This abutment of the two widely spaced alignment ridges 70 against the sloping channel walls at each end of the hinge region 66 forces the folded masks 24 and 26 into proper alignment with each other. It is significant that there are only two spaced ridges 70 provided rather than a continuous ridge extending across the entire hinge as taught in my patent. With a continuous ridge, it is not unlikely that some deformation of or dust on the ridge toward the mid-portion thereof will form a fulcrum causing wobbling at the hinge and thus misalignment of the masks 24 and 26. This wobble problem is avoided with the use of two widely spaced ridges, which provide positive hinge alignment.

As shown in FIGS. 3 and 4, ultrasonic energy directors in the form of small bumps 76 and 77 are provided in the respective masks. All of these energy directing bumps 76 and 77 are shown aligned along two straight lines parallel with the respective side edges 32 and 33 of the slide mount when the masks are folded over in flush together relationship. There is an additional bump 78 which is offset toward each front corner of the mount near the respective ends of the entrance 30 for firmly securing the two front corners of the masks together at opposite ends of the entrance. There may be a plurality of the bumps 78 closely spaced in a group near each of the front corners of the mount. In effect, the mount is advantageously pre-sealed along three edges plus being presealed along the outer portions of the fourth edge. Thus, advantageously, the lateral width W (FIGS. 1 and 5) of the entrance 30 is only slightly greater than the width of the transparency T. The width W is also only slightly greater than the width of the pocket 47 as accounted for by the slight outward flaring of the lateral guide faces 53 (FIG. 3). The relatively compact width W of this entrance into the preclosed mount 22 reduces the likelihood of foreign objects becoming snagged in the opening or damaging the film transparency contained in the mount.

During ultrasonic welding of the two masks in their folded position, these energy directors 76, 77, 78 concentrate ultasonic energy at localized spots to assure secure bonding of the mask by a sequence of spot welds. Also, to provide a clean bond, an isolation groove 54 is provided in the upper mask 24. This isolation groove is positioned to be elevated above the inner margin of the border region 50. Moreover, this isolation groove 54 spans over the inner face 48 of the border region 50 as best shown in FIG. 8. Any plastic flash which might occur during the ultrasonic welding operation remains in the portion of the groove 54 away from the pocket 47. The perimeter of the pocket 47 is thus kept clean for easy insertion of a transparency.

It is to be understood that the particular location of the ultrasonic energy directors 76 and 77 is a matter of reasonable choice, and their locations as shown in FIGS. 3 and 4 is illustrative. It is desirable that the energy directors 78, or groups of such directors, be located generally in the relative position as shown.

As discussed earlier, the sprocket-hole engaging pawl 35 serves to retract the bowed film strip S a short distance during its retraction stroke R, so that the leading end L of the strip will be cleared by the loaded slide mount when the loaded mount is moved laterally, as indicated by the arrow 38. In order to accomplish this retraction of the film strip S, the pawl 35 has a rear surface 80 which extends perpendicular to the length of the film strip S. At the commencement of the retraction stroke R, this rear surface 80 of the pawl abuts against, i.e. hooks onto, the rear edge of the already-engaged sprocket hole 36. Thus, the retracting motion R of the pawl pulls the film strip back out of the entrance 30.

The pawl 35 is pivotally mounted by a pivot pin 82 (FIG. 1A) onto a carriage 84 which can be reciprocated back and forth along a guide rail 86. There is a reciprocating drive mechanism 88 which is connected as indicated by the dashed line 90 to drive the carriage 84 back and forth along the guide rail 86 for producing a forward and a backward stroke F and R of the carriage 84 of the same length during each loading cycle. This reciprocating pawl carriage 84 with its reciprocating drive mechanism 88 and interconnection 90 may be similar to the apparatus as shown in my recently issued patent mentioned above. The pawl 35 is L-shaped and has a downwardly extending leg 91 onto which is hooked a tension spring 92 anchored onto a pin 94 on the carriage. Thus, the forwardly extending leg 96 of the pawl is continuously urged upwardly toward the margin of the film strip S in which the sprocket holes are located.

In order to limit the retraction of the film strip S, to a predetermined minor portion of the pawl retraction stroke R so that its leading end L will stop approximately 1/32nd to 1/16th of an inch away from the end 34 of the slide mount 22, there are pawl-control means 98 to be described. The pawl-control means 98 include a cam-follower pin 100 mounted on the forward leg 96 near its pawl end 35, and a pawl jog bar 102 mounted parallel with the sprocket-hole margin of the film strip. This jog bar has two straight surfaces 104 and 106 with a sloping cam surface 108 between them. The forward straight surface 104 of the pawl jog bar 102 is at a higher elevation than the rear straight surface 106, and both of these straight surfaces 102 and 106 extend parallel with the margin of the film strip in which the sprocket holes are located. The spring 92 urges the cam-follower pin 100 upwardly in sliding contact with the jog bar 102.

The forward straight surface 104 is sufficiently elevated that when the cam-follower pin 100 is sliding rearwardly along this surface 104, the rear surface 80 of the pawl 35 can engage, or hook onto, the rear edge of the same sprocket hole 36 in which it was engaged during the preceding forward stroke F. However, when the retracting motion R (FIG. 1A) of the carriage 84 has reached a predetermined desired amount, the cam-follower pin 100 slides down along the sloping surface 108 causing the rear surface 80 of the pawl to become depressed below the sprocket hole. Thus, the pawl becomes unhooked from the sprocket hole and allows the film strip S to stop. As the carriage 84 continues its retraction stroke R, the cam-follower pin now slides rearwardly along the lower straight surface 106 as shown at 100', causing the pawl to slide rearwardly beneath the sprocket holes as indicated at 35' without engaging in them. The top of the pawl tip is inclined downwardly toward the rear as shown at 110 for enabling the depressed pawl to slide rearwardly as seen as 35' without hooking into the sprocket holes.

After the carriage 84 has fully retracted, the next transparency is cut off from the end of the film strip by cutting means, for example, as described in my recently issued patent. The next slide mount is moved as indicated at 37 into the loading position, for example, by slide mount feed means as described therein, and the carriage 84 begins its forward stroke F. As soon as the forward stroke commences, the inclined top surface 110 on the pawl immediately allows the pawl tip to engage into the adjacent sprocket hole to begin pushing the bowed strip S forward. The cam-follower pin 100 sequentially slides along the surfaces 106-108-104 during the forward stroke of the pawl. During this forward stroke the inclined surface 108 allows the spring-biased pawl to elevate further into the already-engaged sprocket hole. Because the front surface 112 of the pawl extends perpendicular to the margin of the film strip, this further elevation of the pawl during its forward feed stroke does not adversely affect the smooth forward thrust being exerted onto the film strip by the forwardly travelling pawl.

Thus, advantageously the pawl feed mechanism is also used to provide the retraction of film strip out of the entrance 30 of the loaded slide mount. As an example of this pawl feed and retraction operation, the carriage 84 may reciprocate forward and reverse by an overall stroke distance of approximately 1-13/16ths of an inch each way, when feeding film transparencies T having a length of approximately 1.5 inches. The leading end L of the bowed film strip S is advanced into the entrance 30 by a distance of approximately ¼th of an inch for fully inserting the transparency T into the pocket 47. Then, the film strip is retracted by the pawl surface 80 for a distance of approximately 5/16ths of an inch, causing the leading end L of the bowed film strip to stop approximately 1/32nds to 1/16ths of an inch away from the end 34 of the loaded slide mount. The pawl continues retracting for a distance of approximately 1½ inches to complete its retraction stroke.

It will be understood that other stroke lengths can be used depending upon the length of the film transparency and the size of the slide mount and the location of the transparency-receiving pocket within the mount.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. In an apparatus for automatically inserting film transparencies into pre-closed slide mounts each having a pocket therein for receiving the inserted transparency wherein the slide mounts are positioned one at a time in a loading station, a film strip is advanced endwise toward the respective slide mount in the loading station, the leading end portion of the film strip is cut off to form a film transparency in readiness to be loaded into the respective slide mount, the film strip is bowed longitudinally along the film strip for providing longitudinal stiffness in the film strip, and the freshly cut end of the bowed film strip is used for pushing the film transparency endwise through an entranceway into the pocket in said respective slide mount, the improvement comprising:

cutting means for cutting off the leading end portion of the film strip while said leading end portion is entirely outside of said entranceway;

reciprocatable pawl means for engaging a sprocket hole in the film strip;

reciprocating drive means coupled to said pawl means for moving said pawl means in a forward stroke for advancing the bowed film strip endwise toward the respective slide mount in the loading station along a forward stroke distance equal to the length of the film transparency plus an additional extent of forward travel sufficient for pushing the transparency completely through said entranceway into said pocket for loading the transparency into the slide mount; and said reciprocating drive means moving said pawl means in a reverse stroke for retracting said bowed film strip endwise away from the respective slide mount in the loading station by an amount of rearward travel sufficient for completely removing the film strip from the loaded slide mount;

thereby enabling pre-closed mounts to be used in a fast-loading cycle having entranceways which are only slightly wider than the width of the transparency to be inserted therein.

2. The apparatus for automatically inserting film transparencies into pre-closed slide mounts as claimed in claim 1, in which:

means are provided for moving the loaded slide mount laterally away from the loading station in a direction perpendicular to the path of the film strip as the bowed film strip is being retracted from said entranceway for saving time in said fast-loading cycle.

3. The apparatus for automatically inserting film transparencies into pre-closed slide mounts as claimed in claim 1, in which:

said pawl means has front and rear surfaces, said front surface being adapted to engage the front edge of a sprocket hole during said forward stroke and said rear surface being adapted to engage the rear edge of a sprocket hole during said retraction stroke; and control means for disengaging said rear surface of said pawl means from the rear edge of a sprocket hole after said film strip has been retracted by said amount of rearward travel for permitting the pawl means to complete a reverse stroke equal in length to said forward stroke without causing further retraction of said film strip.

4. The apparatus for automatically inserting film transparencies into pre-closed slide mounts as claimed in claim 3, in which:

said control means includes cam means for depressing said pawl means relative to the sprocket hole for disengaging said rear surface thereof from the rear edge of a sprocket hole after said retraction of the film strip has occurred.

5. The apparatus for automatically inserting film transparencies into pre-closed slide mounts as claimed in claim 4, in which:

said pawl means is pivoted by a pivot to a carriage, said spring means urge said pawl means upwardly toward the sprocket holes in the margin of the film strip, said cam means includes forward and rear straight surfaces and with a sloping cam surface between them, said forward surface being at a higher elevation than said rear surface and both of said straight surfaces extend parallel with the margin of the film strip in which the sprocket holes are located, and a cam follower on said pawl means follows said cam surface.

6. The apparatus for automatically inserting film transparencies into pre-closed slide mounts as claimed in claim 5, in which:

said front surface of said pawl means extends up higher than said rear surface, and the top of said pawl means is inclined downwardly toward the rear for causing the pawl depressed by said rear cam surface to slide rearwardly beneath the margin of the film strip without hooking into the sprocket holes.

7. In an apparatus for automatically inserting film transparencies into pre-closed slide mounts each having a pocket therein with an entranceway leading into the pocket for receiving the inserted transparency wherein the pre-closed slide mounts are positioned one at a time in a loading station, a film strip is advanced endwise toward the entranceway into the respective slide mount in the loading station, the leading end portion of the film strip is cut off to form a film transparency in readiness to be inserted into the respective slide mount, the film strip is bowed longitudinally along the film strip for providing longitudinal stiffness in the film strip, and the freshly cut end of the bowed film strip is used for pushing the film transparency endwise through the entranceway into the pocket in said respective slide mount, the improvement comprising:

cutting means for cutting off the leading end portion of the film strip while said leading end portion is entirely outside of said entranceway for forming the film transparency;

reciprocatable pawl means for engaging a sprocket hole in the film strip;

reciprocating drive means coupled to said pawl means for moving said pawl means in a forward stroke for advancing the bowed film strip endwise toward the respective slide mount in the loading station along a forward stroke distance equal to the length of the film transparency plus an additional extent of forward travel sufficient for pushing the transparency completely through said entranceway into said pocket for loading the transparency into the slide mount;

said reciprocating drive means moving said pawl means in a reverse stroke for withdrawing said film strip endwise out from the entranceway in the respective loaded slide mount in the loading station by an amount of rearward travel sufficient for completely withdrawing the film strip from the entranceway in the loaded slide mount;

control means for said pawl means for disengaging said pawl from the sprocket hole after the film strip has been withdrawn from the entranceway in the loaded slide mount; and said reciprocating drive means thereafter moving said disengaged pawl further in the reverse stroke for completion of the reverse stroke in readiness for loading another slide mount.

8. Apparatus as claimed in claim 7, in which:

said pawl means has a front surface for engagement with a sprocket hole during said forward stroke of said pawl means for advancing the bowed film strip, said pawl means has a rear surface for engagement with a sprocket hole during said reverse stroke of said pawl means for withdrawing the bowed film strip, and said control means disengages said rear surface from said sprocket hole after the film strip has been withdrawn from the entranceway in the loaded slide mount for permitting said pawl means to complete the reverse stroke without causing further withdrawing of the film strip.

9. Apparatus as claimed in claim 8, in which:

said pawl means has an inclined surface extending between said rear and front surfaces for allowing said pawl means to slide past sprocket holes in the film strip during completion of the reverse stroke without engaging in those sprocket holes.

10. Apparatus as claimed in claim 9, in which:

said front surface extends higher than said rear surface for engagement in a sprocket hole upon commencement of the next forward stroke.

11. Apparatus as claimed in claim 7, in which:

said pawl means during the completion of the return stroke travels a distance equal to the length of a film transparency to be cut from the leading end portion of the film strip.

* * * * *